United States Patent
Sugaya et al.

(10) Patent No.: US 10,394,870 B2
(45) Date of Patent: Aug. 27, 2019

(54) SEARCH METHOD

(71) Applicant: Hitachi, Ltd., Tokyo (JP)

(72) Inventors: Natsuko Sugaya, Tokyo (JP); Michio Iijima, Tokyo (JP); Atsushi Hatakeyama, Tokyo (JP)

(73) Assignee: Hitachi, Ltd., Tokyo (JP)

(*) Notice: Subject to any disclaimer, the term of this patent is extended or adjusted under 35 U.S.C. 154(b) by 239 days.

(21) Appl. No.: 15/122,780

(22) PCT Filed: Jun. 30, 2014

(86) PCT No.: PCT/JP2014/067438
§ 371 (c)(1),
(2) Date: Aug. 31, 2016

(87) PCT Pub. No.: WO2016/001991
PCT Pub. Date: Jan. 7, 2016

(65) Prior Publication Data
US 2017/0075989 A1    Mar. 16, 2017

(51) Int. Cl.
*G06F 17/30* (2006.01)
*G06F 16/35* (2019.01)
(Continued)

(52) U.S. Cl.
CPC ........ *G06F 16/35* (2019.01); *G06F 16/90344* (2019.01); *G06F 16/93* (2019.01)

(58) Field of Classification Search
CPC .......... G06F 17/3002; G06F 17/30011; G06F 17/30038; G06F 17/30613;
(Continued)

(56) References Cited

U.S. PATENT DOCUMENTS 6,714,927 B1 * 3/2004 Ogawa .............. G06F 17/30616
 704/7
2003/0009453 A1 * 1/2003 Basso ............... G06F 17/30985
(Continued)

FOREIGN PATENT DOCUMENTS

JP          08-069476 A     3/1996
JP          08-194718 A     7/1996
(Continued)

OTHER PUBLICATIONS

International Search Report of PCT/JP2014/067438 dated Aug. 5, 2014.

*Primary Examiner* — Greta L Robinson
(74) *Attorney, Agent, or Firm* — Mattingly & Malur, PC

(57) ABSTRACT

This string search method for a computer that searches documents for a specified string includes the following steps: a first step in which the specified string is divided into a plurality of characters or strings, including a first character or string and a second character or string; a second step in which a plurality of sets are created by grouping a plurality of documents in units; a third step in which a determination is made as to whether or not the first character or string appears in that set; a fourth step in which a determination is made as to whether or not the second character or string appears in that set; and a sixth step in which, if first appearance information and second appearance information were both added to one of the plurality of sets, namely a first set, a detailed search is performed on said first set.

16 Claims, 11 Drawing Sheets

(51) Int. Cl.
*G06F 16/93* (2019.01)
*G06F 16/903* (2019.01)

(58) Field of Classification Search
CPC ......... G06F 17/30619; G06F 17/30631; G06F 17/30705; G06F 17/30864; G06F 17/30958; G06F 17/30985; G06F 16/35; G06F 16/90344; G06F 16/93
USPC .................. 707/706, 712, 715, 797, 800
See application file for complete search history.

(56) References Cited

U.S. PATENT DOCUMENTS

| | | | |
|---|---|---|---|
| 2007/0168363 A1* | 7/2007 | Inaba .................. | G06F 17/2205 |
| 2009/0037381 A1 | 2/2009 | Oshima et al. | |
| 2011/0145260 A1* | 6/2011 | Ichino ............... | G06F 17/30949 |
| | | | 707/747 |
| 2016/0292234 A1* | 10/2016 | Kathewadi ........ | G06F 17/30327 |

FOREIGN PATENT DOCUMENTS

| | | |
|---|---|---|
| JP | 2000-057151 A | 2/2000 |
| JP | 2009-037359 A | 2/2009 |
| JP | 2009-134627 A | 6/2009 |

\* cited by examiner

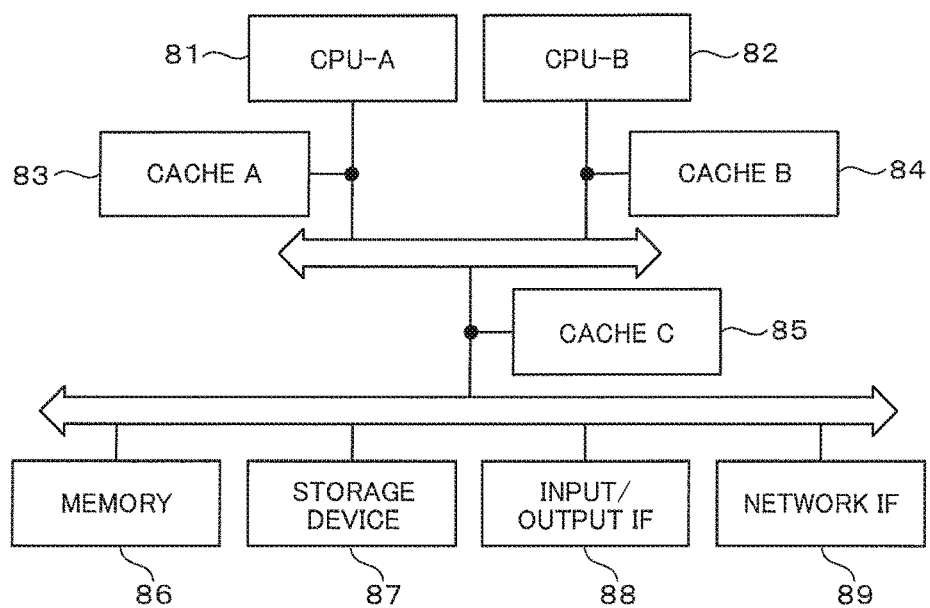
F I G. 8

F I G. 9
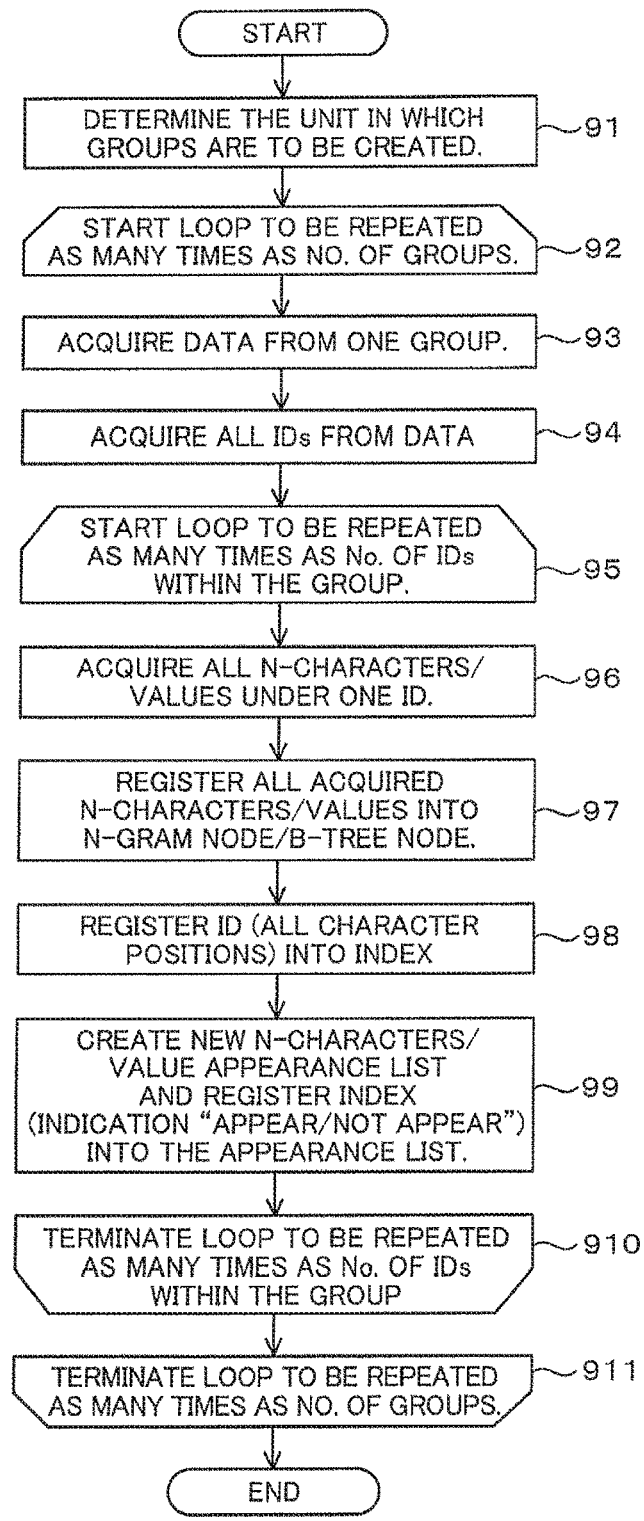

SEARCH METHOD

TECHNICAL FIELD

The present invention relates to a search method.

BACKGROUND ART

To quickly acquire necessary data in a database, it is important to speed up searching the database. Moreover, for instance, for analysis using big data that exists somewhere in the Internet or the like, capability of searching a very high volume of data at a high speed is required.

With regard to speeding up a text search in terms of such search, Patent Literature 1 discloses a technique in which indexes (descriptor tables) on the appearance positions of characters constituting each of all trigrams, such as "abc" and "bcd", are created from a text to search and, if a search word of "abcd" is specified, the appearance positions of characters in an "abc" index and the appearance positions of characters in a "bcd" index are checked to search for contiguous positions (paragraphs 0002 to 0009, FIGS. 2 and 4). And now, such a technique is known as an n-gram method (a trigram method, if an n-gram consists of three characters).

CITATION LIST

Patent Literature

PTL 1: Japanese Patent Application Publication No. Hei 08(1996)-194718

SUMMARY OF INVENTION

Technical Problem

If the technique disclosed in Patent Literature 1 is used, a search can be performed at a higher speed than searching an entire text character by character from the beginning. However, this publication fails to disclose a technical approach about speeding up a search across plural indexes.

Therefore, an object of the present invention is to speed up a search in searching across plural indexes; that is, searching with plural search keys into which a search word was divided.

Solution to Problem

A search method, which is representative of and pertaining to the present invention, is a method for searching for a string with a computer to search a document for a specified string, the method including: a first step of dividing the specified string into a plurality of characters or strings including a first character or string and a second character or string; a second step of grouping a plurality of documents into a plurality of blocks by a unit of data that can be read in by the computer for one read operation; a third step of judging whether or not the first character or string appears in each of the plurality of blocks and attaching a first piece of appearance information indicating appearance of the first character or string to each block in which the appearance occurs; a fourth step of judging whether or not the second character or string appears in each of the plurality of blocks and attaching a second piece of appearance information indicating appearance of the second character or string to each block in which the appearance occurs; and a sixth step in which, if the first piece of appearance information and the second piece of appearance information are attached to a first block in the plurality of blocks, the first block is determined to be searched by a detailed search.

Advantageous Effects of Invention

According to one aspect of the present invention, it is enabled to speed up a search in searching across plural indexes; that is, searching with plural search keys into which a search word was divided.

BRIEF DESCRIPTION OF DRAWINGS

FIG. 8 is a diagram depicting an example of a computer hardware configuration.

FIG. 9 is a diagram illustrating an example of a processing flow for creating appearance lists or the like.

FIG. 10 is a diagram illustrating an example of a search processing flow using appearance lists or the like.

DESCRIPTION OF EMBODIMENTS

Preferred embodiments are described below with reference to the drawings. In the following, descriptions are provided for embodiments which are implemented as processing by a computer. The computer is a general one including a CPU (processor) and a memory. According to a program stored in the memory, the CPU executes processing using data stored in the memory. Hence, in the following description, the computer mentioned as a subject may be replaced by the CPU. And now, although the computer configuration is not limited to the one mentioned above, its specific configuration example will be described later with FIG. 8. The computer can also be regarded as a searching device for performing a search.

Figure 1:
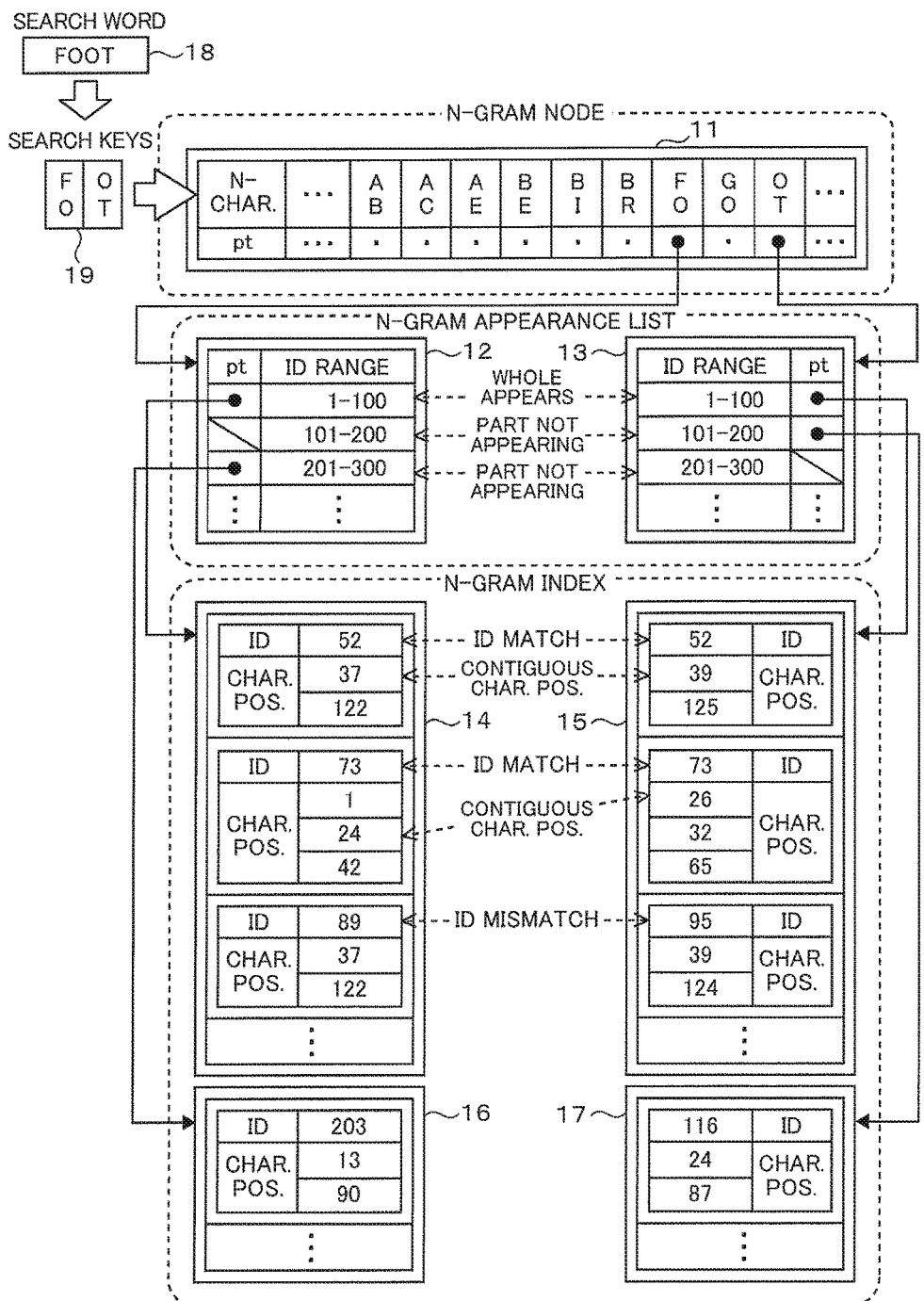
FIG. 1 is a diagram illustrating an example of a search using n-gram appearance lists and indexes.

FIG. 1 is a diagram illustrating an example of an n-gram text search using n-gram appearance lists. Before starting a search, the computer creates in advance an n-gram node 11, n-gram appearance lists 12, 13, and n-gram indexes 14 to 17. The n-gram node 11 is a table that defines mapping between n-characters and pointers (pt). Here, n-characters are assumed to be 2-characters and all 2-characters contained in a text to search are enumerated. Although there are pointers, n-gram appearance lists, and n-gram indexes respectively associated with all characters, e.g., "AB" to "BR" and so on, enumerated in the n-gram node 11, only a part of them, those associated with n-characters "FO" and "OT" are only illustrated here and other ones are left out of the diagram.

N-gram indexes 14, 16 are tables enumerating character positions in which a "FO" appears in the text to search. Here, as for which one of the positions of characters in an n-character should be taken as the base position of the n-character, a consistent position throughout all n-characters should be set as the base position. For the "FO", its base character position, for example, may be set at the position of a "F" or the position of an "O". However, if the base character position of the "FO" is set at the position of the "F", such position of an "OT" will be the position of a "O".

The N-gram indexes 14, 16 include IDs. In general, text to search contains sections and paragraphs, as also described, e.g., in FIG. 4 in Patent Literature 1 and IDs may be assigned to such sections and paragraphs or IDs may be assigned to blocks, each composed of plural lines in the text. Hence, a character position is a relative position from the beginning of a text which is identified by ID. If plural n-characters exist in a text identified by one ID, plural character positions are associated with one ID, as depicted in FIG. 1. N-gram indexes 15, 17 are tables enumerating character positions in which an "OT" appears and their table structure is the same as the n-gram indexes 14, 16.

An n-gram appearance list 12 is a table indicating whether or not "FO" exists in an ID range. Each pointer (pt) points to an n-gram index 14 or 16, if "FO" exists in an ID range to which it is mapped, and it assumes a given value, if "FO" does not exist in an ID range to which it is mapped. A given value which is defaulted when "FO" does not exist is a value that does not point to any n-gram index and may be, e.g., null or zero; it is represented by a slant line in FIG. 1. In an example illustrated in FIG. 1, because "FO" exists in texts identified by IDs 52, 73, 89, and 203, the pointers mapped to ID ranges of 1 to 100 and 201 to 300 in the n-gram appearance list 12 point to an n-gram index 14 and an n-gram index 16, respectively. "FO" does not exist in an ID range of 101 to 200.

An n-gram appearance list 13 is a table indicating whether or not "OT" exists in an ID range and its table structure is the same as the n-gram appearance list 12. Here, the value ranges of ID ranges in the n-gram appearance list 12 are completely the same as the value ranges of ID ranges in the n-gram appearance list 13. In the example illustrated in FIG. 1, the value ranges are 1 to 100, 101 to 200, 201 to 300, and so on in units of 100. Since the value ranges of ID ranges are the same in different n-gram appearance lists, it can be judged that, in both the ID ranges of 101 to 200 and 201 to 300, either "FO" or "OT" does not exist and, therefore, "FOOT" does not exist.

Thus, the computer sets the ID ranges to the same value ranges for all n-gram appearance lists including n-gram appearance lists for n-characters, such as "AB", which are left out of this diagram, and the n-gram appearance lists 12, 13. Moreover, an n-gram index is configured so that ID values in the n-gram index fall within the ID range to which the pointer from an n-gram appearance list to the n-gram index is mapped. In the example illustrated in FIG. 1, the pointer mapped to an ID range of 1 to 100 in the n-gram appearance list 12 points to an index that includes ID values 52, 73, 89 which fall within the range of 1 to 100; in this way, the n-gram index 14 is set as one group.

And now, although the data structures mentioned are assumed as tables in the above description, the data structures are not limited to tables and may be data structures other than such tables, provided that they can be managed consistently. Moreover, structures which appear to be associative or grouped in FIG. 1, are not limited to structures of data with contiguous addresses in a memory and the like and may be structures that can be managed consistently.

In the following, an example of processing in an instance where a search word 18, which is a search condition, is "FOOT" is described below. When "FOOT" is input as the search word 18 the computer divides it into "FO" and "OT" as search keys 19, since it performs a search based on n-grams, i.e., bigrams, herein. Then, the computer searches for "FO" and "OT" as n-characters in the n-gram node 11, respectively. Upon finding "FO" and "OT" respectively, the computer follows the pointers mapped to "FO" and "OT", respectively and acquires the n-gram appearance list 12 and the n-gram appearance list 13.

Since pointers mapped to an ID range of 1-100 in both the n-gram appearance list 12 and the n-gram appearance list 13 indicate that "FO" and "OT" exist in this ID range, the computer follows these pointers and acquires the n-gram index 14 and the n-gram index 15. Since pointers mapped to ID ranges of 101 to 200 and 201 to 300 indicate that either "FO" or "OT" only exits in these ID ranges, the computer does not flow these pointers. Thus, the computer does not acquire both an n-gram index 16 and an n-gram index 17 and excludes them from processing objects.

The computer checks for ID value matching between both the n-gram index 14 and the n-gram index 15 and checks for contiguous character positions under the IDs found to match. In the example illustrated in FIG. 1, the computer finds that ID values of 52 match and that character position values of 37 and 39 are contiguous character positions. The character position of "F" is 37, the character position of "O" in the "FO" is 38, and the character position of "O" in the "OT" is 39. Under the ID values of 52 that match, character position values of 122 and 125 are not contiguous character positions; so, the computer proceeds to a next object to check.

The computer finds that ID values of 73 match. Since character position values of 1 and 26 are not contiguous character positions, the computer shifts the object to check to a next character position value in the n-gram index 14 including a smaller one of the above character position values and finds that character position values of 24 and 26 are contiguous character positions. Under the ID values of 73, the remaining character position values are not contiguous character positions; so, the computer proceeds to a next object to check. Since ID values of 89 and 95 do not match and "OT" does not exist in a text with an ID value of 89, the computer shifts the object to check to a next ID value in the n-gram index 14 including a smaller one of the above ID values until finding an ID value of 95 or more. Then, if the computer finds a next ID value of 95 which is matching, which is left out of this diagram, in the n-gram index 14, the computer proceeds to checking on character position values. If a next ID value is larger than 95, the computer shifts the object to check to a next ID in the n-gram index 15 until finding an ID value equal to or more than the ID value of 95. In this way, the computer checks on all IDs in both the n-gram index 14 and the n-gram index 15.

And now, although processing using two n-gram appearance lists has been described, if the search word 18 consists of five or more characters and the search keys 19 are three or more, there are n-gram appearance lists as many as the number of the search keys 19 and checking on IDs in the n-gram indexes should be performed only if there are pointers mapped to a same ID range exist in all the n-gram appearance lists.

As described in the foregoing, the computer can perform a text search for a word "FOOT" by finding contiguous character positions of "FO" and "OT". Moreover, the computer excludes the n-gram indexes 16, 17 from the objects to check, based on the n-gram appearance lists 12, 13; this can reduce search processing tasks including checking, thus enabling it to speed up a text search.

Figure 2:
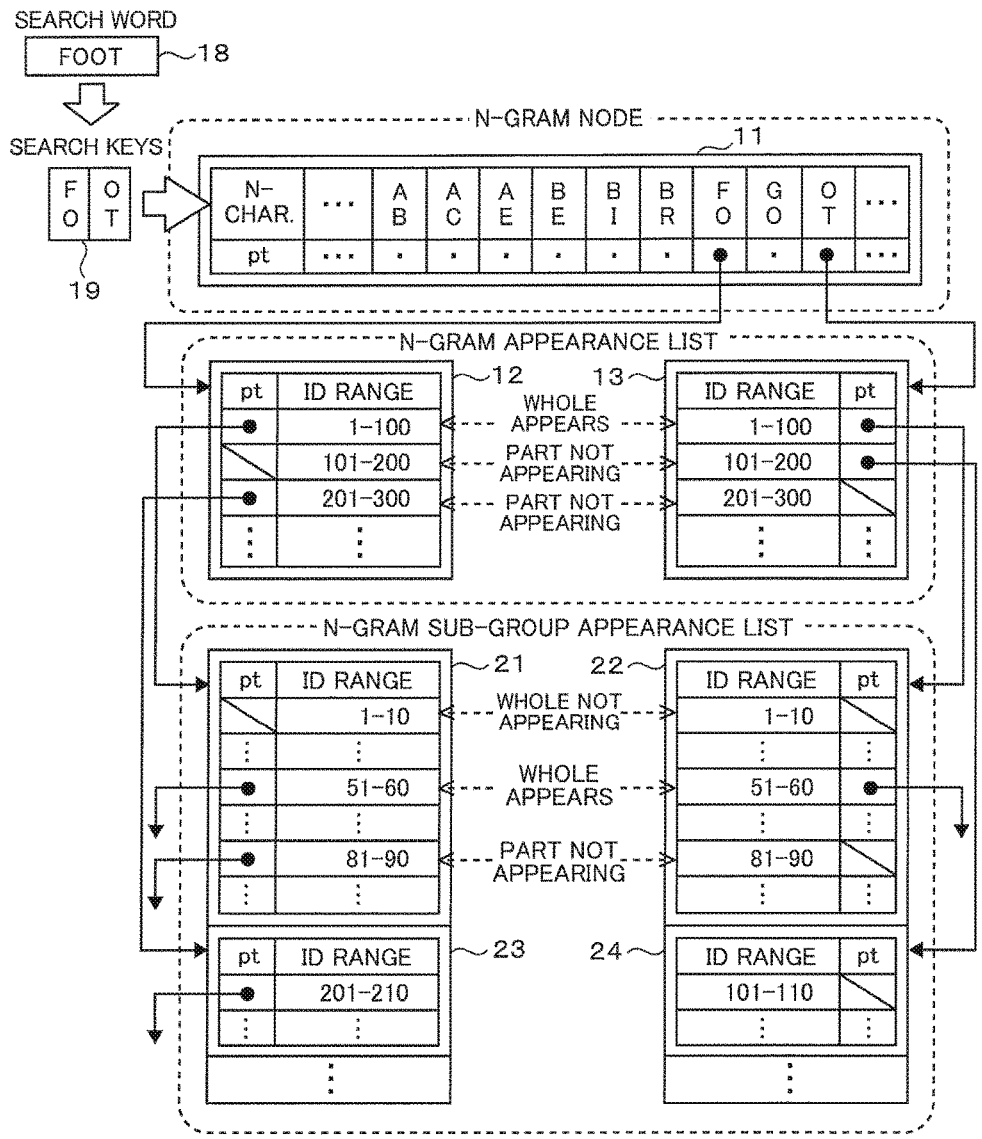
FIG. 2 is a diagram illustrating an example of stratified n-gram appearance lists.

FIG. 2 is a diagram illustrating an example of n-gram appearance lists stratified based on ID ranges. The search word 18, search keys 19, n-gram node 11, n-gram appearance lists 12, 13 are the same as those described with FIG. 1. However, the pointers in the n-gram appearance lists point to sub-group wise n-gram appearance lists, not the n-gram indexes. A sub-group wise n-gram appearance list 21 whose data structure is the same as that described for the n-gram appearance list 12 is a table indicating whether or not "FO" exists in an ID range, but ID value ranges in this list differ from those in the n-gram appearance list 12.

A sub-group wise n-gram appearance list 22 whose data structure is also the same as that described for the n-gram appearance list 13 is a table indicating whether or not the "OT" exists in an ID range, but ID value ranges in this list differ from those in the n-gram appearance list 13. The value ranges of ID ranges in the sub-group wise n-gram appearance list 21 are completely the same as the value ranges of ID ranges in the sub-group wise n-gram appearance list 22. In an example illustrated in FIG. 2, the ID ranges are 1 to 10, 11 to 20, 21 to 30, . . . 91 to 100 in units of 10.

In FIG. 2, n-gram indexes, which are left out of the diagram, include the same information as described with FIG. 1. Since both the n-gram index 14 and the n-gram index 15 include an ID value of 52, pointers mapped to an ID range of 51 to 60 in both the sub-group wise n-gram appearance list 21 and the sub-group wise n-gram appearance list 22 indicate that "FO" and "OT" exist respectively in this range. In contrast, "OT" does not exist in an ID range of 81 to 90 and a pointer mapped to the ID range of 81 to 90 in the sub-group wise n-gram appearance list 22 assumes a given value which is defaulted when "OT" does not exist.

As described previously, since the pointers mapped to the ID range of 1-100 in both the n-gram appearance list 12 and the n-gram appearance list 13 indicate that "FO" and "OT" exist in this range, the computer follows these pointers. Then, it acquires the sub-group wise n-gram appearance list 21 and the sub-group wise n-gram appearance list 22 respectively. In both the sub-group wise n-gram appearance list 21 and the sub-group wise n-gram appearance list 22, pointers mapped to an ID range of 1 to 10 indicate that neither "FO" nor "OT" exists; so, the computer proceeds to a next object to check.

When the object to check comes to an ID range of 51 to 60, since pointers mapped to the ID range of 51 to 60 indicate that both "FO" and "OT" exist in this range, the computer follows the pointers and checks on IDs in the n-gram index 14 and the n-gram index 15. Upon completion of checking on ID values up to 60 in both the n-gram index 14 and the n-gram index 15, the computer shifts the object to check to an ID range of 61 to 70 in both the sub-group wise n-gram appearance list 21 and the sub-group wise n-gram appearance list 22.

When the object to check comes to an ID range of 81 to 90, a pointer mapped to the ID range of 81 to 90 in the sub-group wise n-gram appearance list 21 indicates that "FO" exists in this range, but a pointer mapped to the ID range of 81-90 in the sub-group wise n-gram appearance list 22 indicates that "OT" does not exist in this range; so the computer proceeds to a next object to check without following the pointer. Here, since the pointers mapped to ID ranges of 101 to 200 and 201 to 300 in the n-gram appearance list 12 and the n-gram appearance list 13 indicate that either "FO" or "OT" does not exist, the computer does not follow these pointers. Hence, the computer does not acquire both a sub-group wise n-gram appearance list 23 and a sub-group wise n-gram appearance list 24 and excludes them from processing objects.

And now, although two strata of n-gram appearance lists and sub-group wise n-gram appearance lists are assumed to be used in the example illustrated in FIG. 2, the ID ranges may be subdivided into subgroups to form more strata.

As described in the foregoing, based on the sub-group wise n-gram appearance lists 21, 22, the computer excludes the ID range of 81 to 90 including an ID value of 89 from the objects to check; this can further reduce search processing tasks, thus enabling it to speed up a text search.

Figure 3:
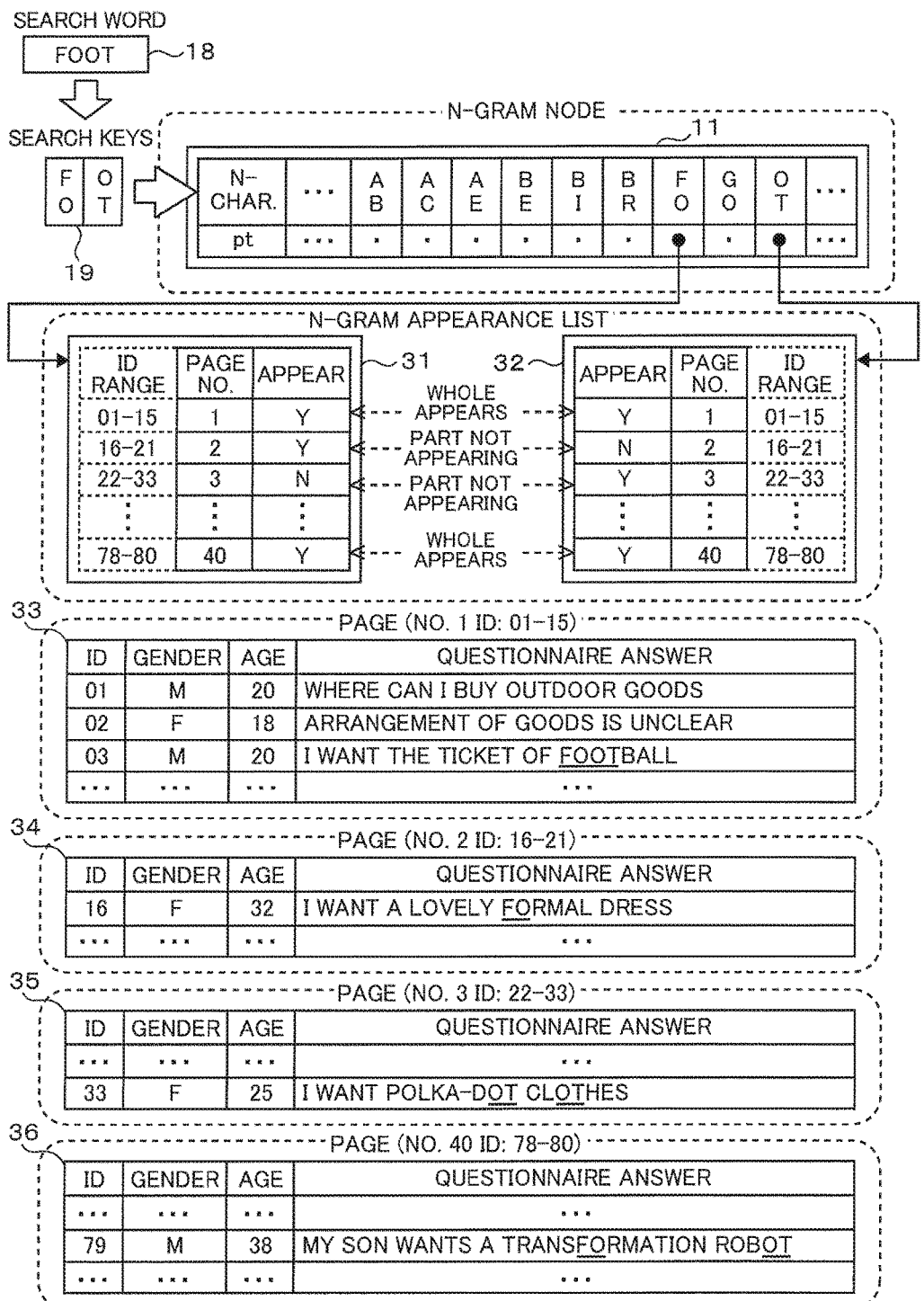
FIG. 3 is a diagram illustrating an example of a search using n-gram appearance and text scan.

FIG. 3 is a diagram illustrating an example of scanning texts instead of n-gram indexes. In this example, reading a text to search among others is managed in units of pages and the CPU reads a particular page by specifying a page number. Capacity of one page is, for example, an amount of data that can be read for one read operation and it is, e.g., 8 KB (kilobytes). In general, a computer's OS (operating system) or file system manages data in lumps of a predefined data size which is called a cluster size and the like as a unit of reading and the capacity of a page may be a cluster size. Moreover, in a case where an application program for databases and the like manages data in lumps of a predefined data size as a unit of reading, the capacity of a page may be the data size to be managed by the application program.

The search word 18, search keys 19, and n-gram node 11 illustrated in FIG. 3 are the same as those described with FIG. 1. An n-gram appearance list 31 includes page numbers and information as to whether or not "FO" appears on each page. An n-gram appearance list 32 includes page numbers and information as to whether or not "OT" appears on each page. Here, there is correspondence between the page numbers in the n-gram appearance list 31 and the page numbers in the n-gram appearance list 32 and the capacity of a page assigned the same page number is the same. And now, ID ranges are included in this diagram to explain mapping relations between ID ranges and page numbers and they are not necessary as the contents of the n-gram appearance lists 32, 33.

A page 33 is an object to scan that is to be read when page number 1 is specified and includes objects to scan identified by IDs of 01 to 15 respectively. In this example, questionnaire answers are a text to search by a text search and the page 33 includes columns: ID, gender, and questionnaire answer. Since a questionnaire answer associated with an ID of 03 includes both "FO" and "OT", there is an "appear" ("Y" in FIG. 3) indication for page number 1 including the ID of 03 in both an "appear/not appear" ("APPEAR" in FIG. 3) indication column of the n-gram appearance list 31 and an "appear/not appear" ("APPEAR" in FIG. 3) indication column of the n-gram appearance list 32. A page 34 is an object to scan that is to be read when page number 2 is specified and has the same structure as the page 33. Since a questionnaire answer in the page 34 does not include "OT" and a questionnaire answer associated with an ID of 16 includes "FO", there is an "appear" indication for page 2 in the "appear/not appear" indication column of the n-gram appearance list 31 and there is a "not appear" ("N" in FIG. 3) indication for page number 2 in the "appear/not appear" indication column of the n-gram appearance list 32.

A page 35 and a page 36 are also objects to scan that are to be read when page number 3 and page number 40 are specified respectively and have the same structure as the page 33. Since a questionnaire answer in the page 35 does not include "FO" and a questionnaire answer associated with an ID of 33 includes "OT", there is a "not appear" indication for page number 3 in the "appear/not appear" indication column of the n-gram appearance list 31 and there is an "appear" indication for page 2 in the "appear/not appear" indication column of the n-gram appearance list 32. A questionnaire answer associated with an ID of 79 includes both "OT" and "FO", there is an "appear" indication for page number 40 including the ID of 79 in both the "appear/not appear" indication column of the n-gram appearance list 31 and the "appear/not appear" indication column of the n-gram appearance list 32.

When text search processing starts, the computer acquires the n-gram appearance list 31 and the n-gram appearance list 32 according to the same processing as described with FIG. 1. Since there is an "appear" indication for page number 1 in both the "appear/not appear" indication column of the n-gram appearance list 31 and the "appear/not appear" indication column of the n-gram appearance list 32, the computer specifies page number 1, reads the page 33, and scans questionnaire answers on the page. For scanning, the computer acquires gender and age associated with an ID of 01 in the page 33 that it has read and scans the text of a questionnaire answer for "FOOT". This scan processing may be judging whether or not there is a match, character by character or similar processing.

Upon completion of scanning the questionnaire answer associated with the ID of 01, the computer shifts the object to scan to an ID of 02. When the computer further shifts the object to scan to an ID of 03, the computer finds "FOOT" in a word "FOOTBALL". When having scanned a questionnaire answer associated with an ID of 15, in other words, all questionnaire answers on the page 33, the computer checks for an "appear" or a "not appear" indication for page number 2 in both the n-gram appearance list 31 and the n-gram appearance list 32. In this example, since there is a "not appear" indication for page number 2 in the "appear/not appear" indication column of the n-gram appearance list 32, the computer excludes the page 34 from the objects to scan and proceeds to checking for an "appear" or a "not appear" indication for page number 3. Since there is a "not appear" indication for page number 3 in the "appear/not appear" indication column of the n-gram appearance list 31, the computer excludes the page 35 from the objects to scan and proceeds to checking for an "appear" or a "not appear" indication for page number 4.

When the computer thus proceeds to checking for an "appear" or a "not appear" indication for each page number up to page number 40, it finds that there is an "appear" indication for page number 40 in both the "appear/not appear" indication column of the n-gram appearance list 31 and the "appear/not appear" indication column of the n-gram appearance list; so the computer specifies page number 40 and reads a page 36. The computer scans a questionnaire answer associated with an ID of 78 as an object to scan and then scans a questionnaire answer associated with an ID of 79 as an object to scan. Since this questionnaire answer includes the "OT" and "FO", but does not include the word "FOOT", the computer does not find "FOOT", while scanning for "FOOT" as the search word 18.

As described in the foregoing, based on the n-gram appearance lists 31, 32, the computer excludes the pages 34, 35 from the objects to scan; this can reduce search processing tasks, thus enabling it to speed up a text search, even when scanning texts instead of n-gram indexes. Moreover, because of management of whether or not a string matching each of the search keys appears on a page which is the unit of reading, the computer does not perform reading a text not including a string matching an individual search key.

Figure 4:
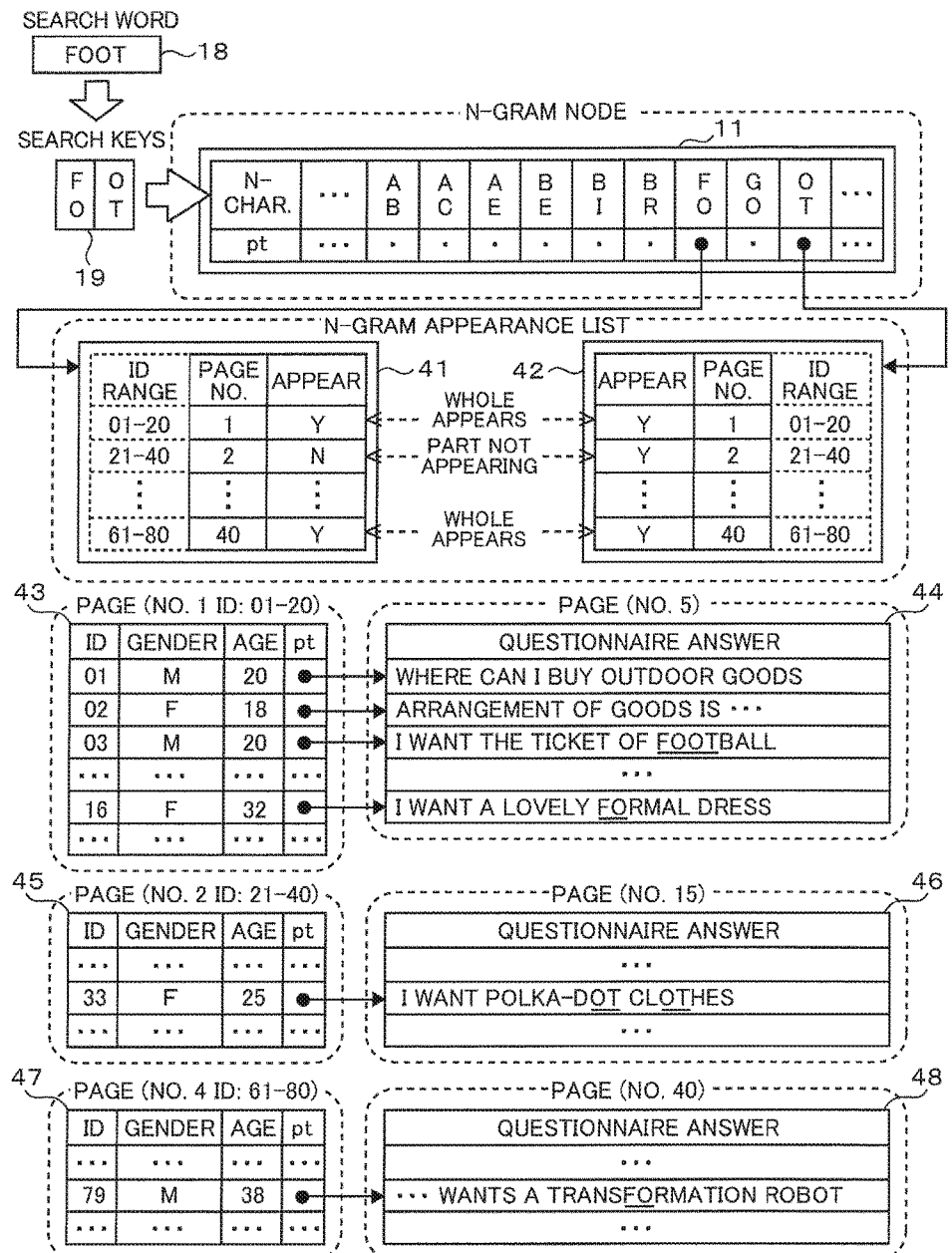
FIG. 4 is a diagram illustrating an example of a search using scanning texts separated off.

FIG. 4 is a diagram illustrating an example in which questionnaire answers are separated off. The search word 18, search keys 19, n-gram node 11 are the same as those described with FIG. 1. An n-gram appearance list 41 has the same structure as the n-gram appearance list 31 described with FIG. 3 and includes page numbers and information as to whether or not "FO" appears on each page, but an ID range mapped to one page differs. An n-gram appearance list 42 also has the same structure as the n-gram appearance list 32 and includes page numbers and information as to whether or not "OT" appears on each page, but an ID range mapped to one page differs.

A page 43 includes information to be read when page number 1 is specified, the information being associated with IDs of 01 to 20. The page 43 includes columns: ID, gender, and a pointer (pt) to a questionnaire answer. This pointer may include the page number of a page in which a questionnaire answer is included and the position of a character at the beginning of each text of a questionnaire answer within the page. Mapping relations between IDs and questionnaire answers are the same for the pages 33, 34 depicted in FIG. 3. By separating off questionnaire answers to a page 44, the page 44, is allowed to include information relative to more IDs as compared with the page 33, even having the same capacity as the page 33.

Moreover, the page 43 does not include questionnaire answers of variable length and, therefore, each page like this page can include an equal amount of information associated with an equal ID range. In the n-gram appearance list 31 depicted in FIG. 3, an ID range mapped to page number 1 is 1 to 15, a range of 15 IDs and an ID range mapped to page number 2 is 16 to 21, a range of six IDs, whereas, in the n-gram appearance list 41 depicted in FIG. 4, both an ID range mapped to page number 1 and an ID range mapped to page number 2 are a range of 20 IDs.

The page 44 is an object to scan that is to be read when page number 5 is specified and includes texts of questionnaire answers. Since the page 44 does not include anything other than questionnaire answers, the page 44 is allowed to include more questionnaire answers as compared with the page 33, even having the same capacity as the page 33. Pages 45 to 48 also have the same structures as the pages 43 and 44. And now, although a questionnaire answer mapped to a ID in the page 43 exists in the page 33 in an example illustrated in FIG. 4, no limitation to such mapping is intended; there may be a situation where a questionnaire answer mapped to an ID in the page 43 is separated such that a part thereof exists in the page 44 and the remaining part thereof exists in another page 46 depending on page capacity and text capacity. Moreover, there may be a situation where questionnaire answers mapped to a subset of IDs in a page 45 and questionnaire answers mapped to a subset of IDs in a page 47 are assembled in the page 46.

Instead of reading the page 33, already described with FIG. 3, the computer reads the page 43, follows pointers within the page 43, and reads the page 44, thus scanning questionnaire answers as the objects to scan.

As described in the foregoing, it is enabled to acquire information relevant to more IDs for one read operation. Moreover, data structures for which texts of variable length are managed using pointers are commonly and widely used. Even for such data structures, based on the n-gram appearance lists 41, 42, the computer excludes the pages 45, 46 from the objects to scan; this can reduce search processing tasks, thus enabling it to speed up a text search.

Figure 5:
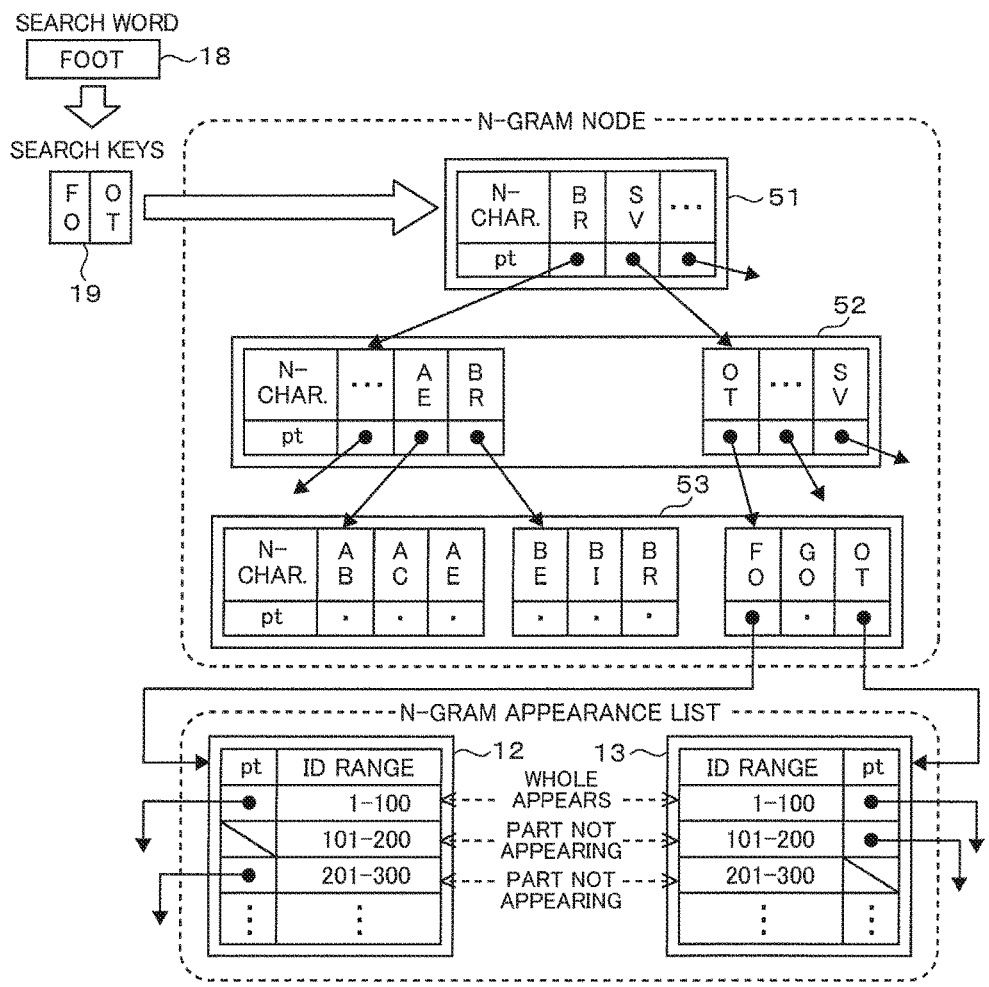
FIG. 5 is a diagram illustrating an example in which n-gram nodes are arranged in a tree structure.

FIG. 5 is a diagram illustrating an example in which n-gram nodes are arranged in a tree structure. The search word 18, search keys 19, n-gram appearance lists 12, 13 are the same as those described with FIG. 1. An example of n-gram node arrangement depicted in FIG. 5 has a tree structure and is composed of a first stratum n-gram node 51 which is a root, a second stratum n-gram node 52, and a third stratum n-gram node 53 which is a leaf. The n-gram node 53 has the same contents as the n-gram node 11 and includes n-characters (2-characters) and pointers to n-gram indexes, the pointers being mapped to the n-characters.

The n-gram node 52 includes pointers to the n-gram node 53. A pointer mapped to an n-character "AE" in the n-gram node 52 points to n-characters "AB", "AC", and "AE in the n-gram node 53. The pointer depicted in FIG. 5 is represented by an arrow to an n-character "AB" which is representative of three n-characters "AB", "AC", and "AE. Likewise, a pointer mapped to an n-character "BR" in the n-gram node 52 points to n-characters "BE", "BI", and "BR" in the n-gram node 53 and a pointer mapped to an n-character "OT" in the n-gram node 52 points to n-characters "FO", "GO", and "OT" in the n-gram node 53.

A pointer mapped to an n-character "BR" in the n-gram node 51 points to a set of n-characters including "AE" and "BR" in the n-gram node 52 and a pointer mapped to an n-character "SV" in the n-gram node 51 points to a set of n-characters including "OT" and "SV" in the n-gram node 52. Hence, n-characters which are positioned between "BR" and "SV" are present at the destination of the pointer mapped to "SV" and n-characters which are positioned between "AE" and "BR" are present at the destination of the pointer mapped to "BR".

The computer divides "FOOT" as the search word 18 which is a search condition into "FO" and "OT" as the search keys 19 and, then, searches for "FO" and "OT" respectively from the n-gram node 51. The computer compares "FO", one of the search keys 19, with the n-character "BR" and, then, with the n-character "SV" and judges that "FO" is positioned between "BR" and "SV". Then, the computer follows the pointer mapped to "SV" and acquires a set of n-characters including "OT" and "SV" in the n-gram node 52. The computer compares "FO", one of the search keys 19, with the n-character "OT" in the n-gram node 52 and judges that "FO" is present nearer "BR" in relation to "OT", that is, "FO" is positioned between "OT" and "BR".

Thus, the computer follows the pointer mapped to "OT" and finds "FO" in the n-gram node 53; then, it follows the pointer mapped to "FO" and acquires an n-gram appearance list 12. Subsequent processing is the same as the processing already described with FIG. 1. Also for "OT", the other one of the search keys 19, similarly, the computer follows the pointer mapped to "SV" in the n-gram node 51, follows the pointer mapped to "OT" in the n-gram node 52, and finds "OT" in the n-gram node 53; then, it follows the pointer mapped to "OT" and acquires an n-gram appearance list 13.

As is obvious from the foregoing description, as against a search manner in which, using the n-gram node 11 depicted in FIG. 1, the computer compares each of n-characters "AB", "AC", "AE", "BE", etc. with one of the search keys 19 in order one by one, the use of the n-gram nodes arranged in a tree structure enables the computer to find an n-character that matches one of the search keys 19 with less comparisons and in a shorter time. And now, the more the number of strata in a tree structure, the number of comparisons required increases; hence, the number of comparisons is reduced by making the number of strata consistent and fewer. Therefore, a so-called balanced tree structure is preferable.

As described in the foregoing, the computer can acquire n-gram appearance lists in a shorter time from the start of a search by using a tree structure of n-gram nodes. Because n-gram appearance lists can be used even with a tree structure of n-gram nodes, the effect of speeding up a search, described by using FIG. 1 and others, can be obtained. And now, although a tree structure of n-gram nodes in which a same n-character is placed in each stratum, that is, a tree structure in which the n-gram nodes 51, 52, 53 include "BR" has been described; it may be, for example, a tree structure in which n-characters in the n-gram node 51 are 1-characters, n-characters in the n-gram node 52 are 2-characters, and n-characters in the n-gram node 53 are 3-characters. That is, it may be a tree structure in which "ABC" is stratified as "A", "AB", and "ABC".

Figure 6:
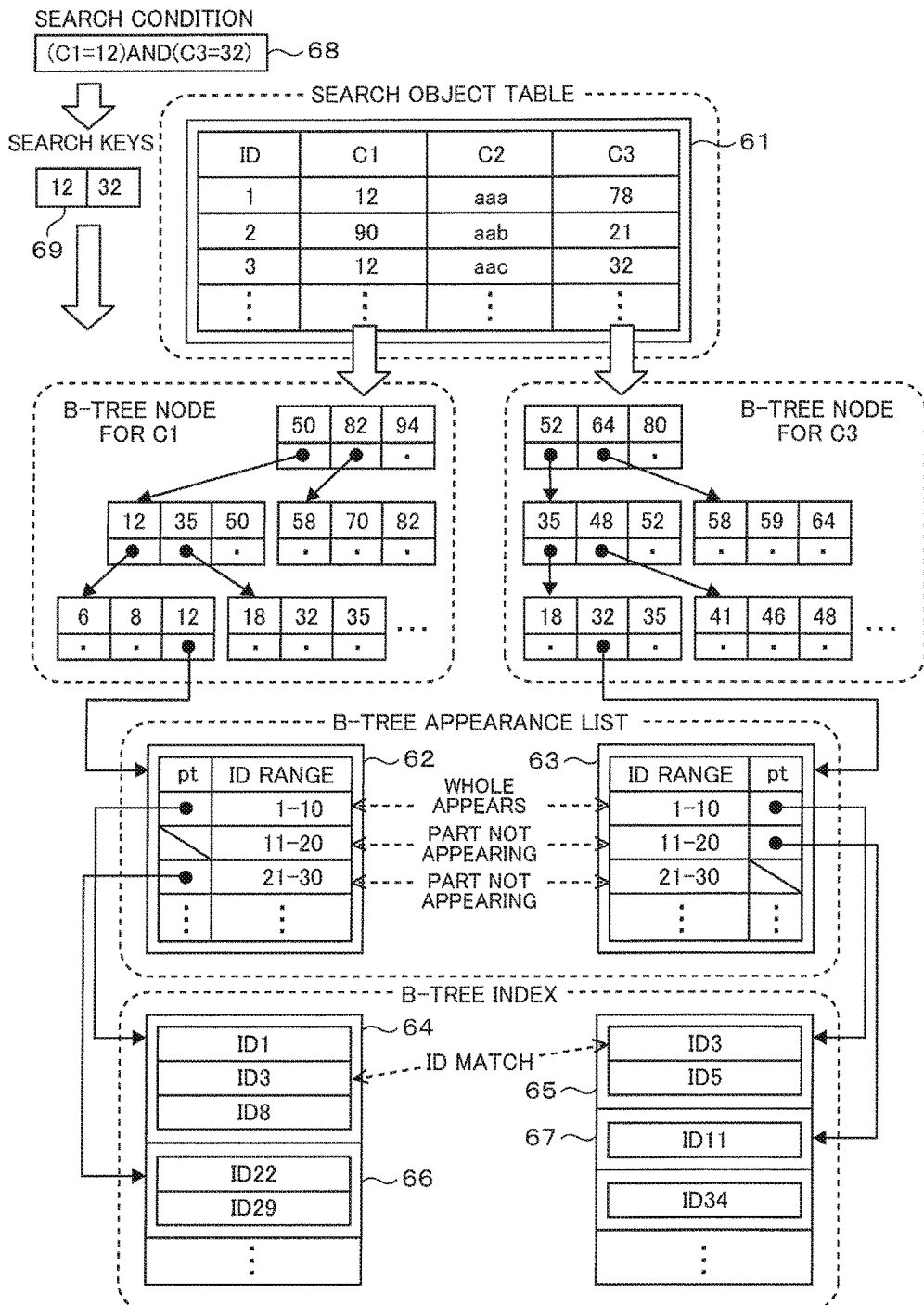
FIG. 6 is a diagram illustrating an example of a search using B-tree appearance lists and indexes.

FIG. 6 is a diagram illustrating an example of a search using B-tree. Appearance lists described hereinbefore can also be used in a search using B-tree, not only in a text search. A search object table 61 includes values for four items, ID, C1, C2, and C3 and is a table in which an ID value that matches a value of each item of C1, C2, and C3 is searched for. Before starting a search, the computer makes a B-tree node for C1, a B-tree node for C2 which is left out of the diagram, and a B-tree node for C3 expanded from the search object table 61. Here, the B-tree nodes have a general B-tree structure and, therefore, description of their structure is omitted.

Each value in B-tree nodes depicted in FIG. 6 corresponds to a value of C1 or C3. A pointer from a B-tree node to one of B-tree appearance lists 62, 63 is information identifying an ID value. However, in the search object table 61, plural ID values are mapped to one value of C1. In the search object table 61 depicted in FIG. 6, there are 1 and 3 as ID values mapped to a C1 value of 12 and ID values of 8, 22, and 29 which are left out of the search object table 61 depicted are also mapped to the C1 value of 12, as presented in B-tree indexes 64, 66.

Since the same processing for IDs described with FIG. 1 is performed, the B-tree appearance lists 62, 63 include ID ranges and pointers (pt). That is, the B-tree appearance lists 62, 63 include pointers to B-tree indexes 64 to 67; if an ID exists within an ID range, a pointer mapped to the ID range points to a B-tree index in which the ID exists. If an ID does not exist within a ID range, the B-tree appearance lists 62, 63 also include a given value as the value of a pointer which indicates that the ID does not exist. Here, the value ranges of ID ranges in the B-tree appearance list 62 are the same as the value ranges of ID ranges in the B-tree appearance list 63.

B-tree indexes 64, 66 are enumerations of, when a value of C1 is 12, ID values mapped to this value in the search object table 61. A B-tree index 64 includes ID values falling within a range of 1 to 10 and a B-tree index 66 includes ID values falling within a range of 21 to 30. Here, an ID value falling within a range of 11 to 20 does not exist. Moreover, B-tree indexes 65, 67 are enumerations of, when a value of C3 is 32, ID values mapped to this value in the search object table 61 search object table 61. A B-tree index 65 includes ID values falling within a range of 1 to 10 and a B-tree index 67 includes ID values falling within a range of 11 to 20.

After expanding the search object table 61 to the B-tree nodes, the computer creates the B-tree indexes 64 to 67, creates the B-tree appearance lists 62, 63, and connects each index and each list with pointers. When starting a search, the computer converts a search condition 68 to search keys 69. In this example, the search condition 68 is an AND condition: a value of C1 is 12 and a value of C3 is 32. Hence, conversion is made to the search keys 69: 12 which is the value of C1 and 32 which is the value of C2. Then, an ID mapped to a C1 value that matches 12 as one value of the search keys 69 is searched for and an ID mapped to a C2 value that matches 32 as the other value of the search keys 69 is searched for.

Since 12 as one value of the search keys 69 matches a value of 12, which is below a value of 50, in the B-tree node for C1, the computer acquires the B-tree appearance list 62. In addition, since 32 as the other value of the search keys 69 matches a value of 32 which is below a value of 52 and below a value of 35 in the B-tree node for C3, the computer acquires the B-tree appearance list 63. As already noted, the value ranges of ID ranges in the B-tree appearance list 62 are the same as the value ranges of ID ranges in the B-tree appearance list 63. The computer judges that an ID exists in both the B-tree appearance list 62 and the B-tree appearance list 63 in an ID range of 1 to 10, follows pointers, and acquires the B-tree index 64 and B-tree index 65, respectively.

The computer compares an ID of 1 at the head of the B-tree index 64 and an ID of 3 at the head of the B-tree index 65. Since these ID values do not match and the ID value in the B-tree index 64 is smaller, the computer shifts the object to check, i.e., the object to compare to a next ID in the B-tree index 64. The compares an ID of 3 in the B-tree index 64 and an ID of 3 in the B-tree index 65. Since these ID values match, the computer finds 3 as an ID value that fulfills the search condition 68. Further, the computer shifts the object to check to a next one and compares an ID of 8 in the B-tree index 64 and an ID of 5 in the B-tree index 65. Since these ID values do not match and last ones in the B-tree index 64 and B-tree index 65, the computer shifts the object to check in the B-tree appearance list 62 and B-tree appearance list 63 to an ID range of 11 to 20.

The computer judges that an ID does not exist in the ID range of 11 to 20 from the pointer mapped to the ID range of 11 to 20 in the B-tree appearance list 62, excludes the B-tree index 67 which is the destination of the pointer mapped to the ID range of 11 to 20 in the B-tree appearance list 63 from the objects to check, and judges that the search condition 68 is not fulfilled. Further, the computer shifts the object to check in the B-tree appearance list 62 and B-tree appearance list 63 to an ID range of 21 to 30. The computer judges that an ID does not exist in the ID range of 21 to 30 from the pointer mapped to the ID range of 21 to 30 in the B-tree appearance list 63, excludes the B-tree index 66 which is the destination of the pointer mapped to the ID range of 21 to 30 in the B-tree appearance list 62 from the objects to check, and judges that the search condition 68 is not fulfilled.

As described in the foregoing, also in a search using B-tree, based on the B-tree appearance lists, the computer excludes the B-tree indexes 66, 67 from the objects to check; this can reduce search processing tasks, thus enabling it to speed up an ID search.

Figure 7:
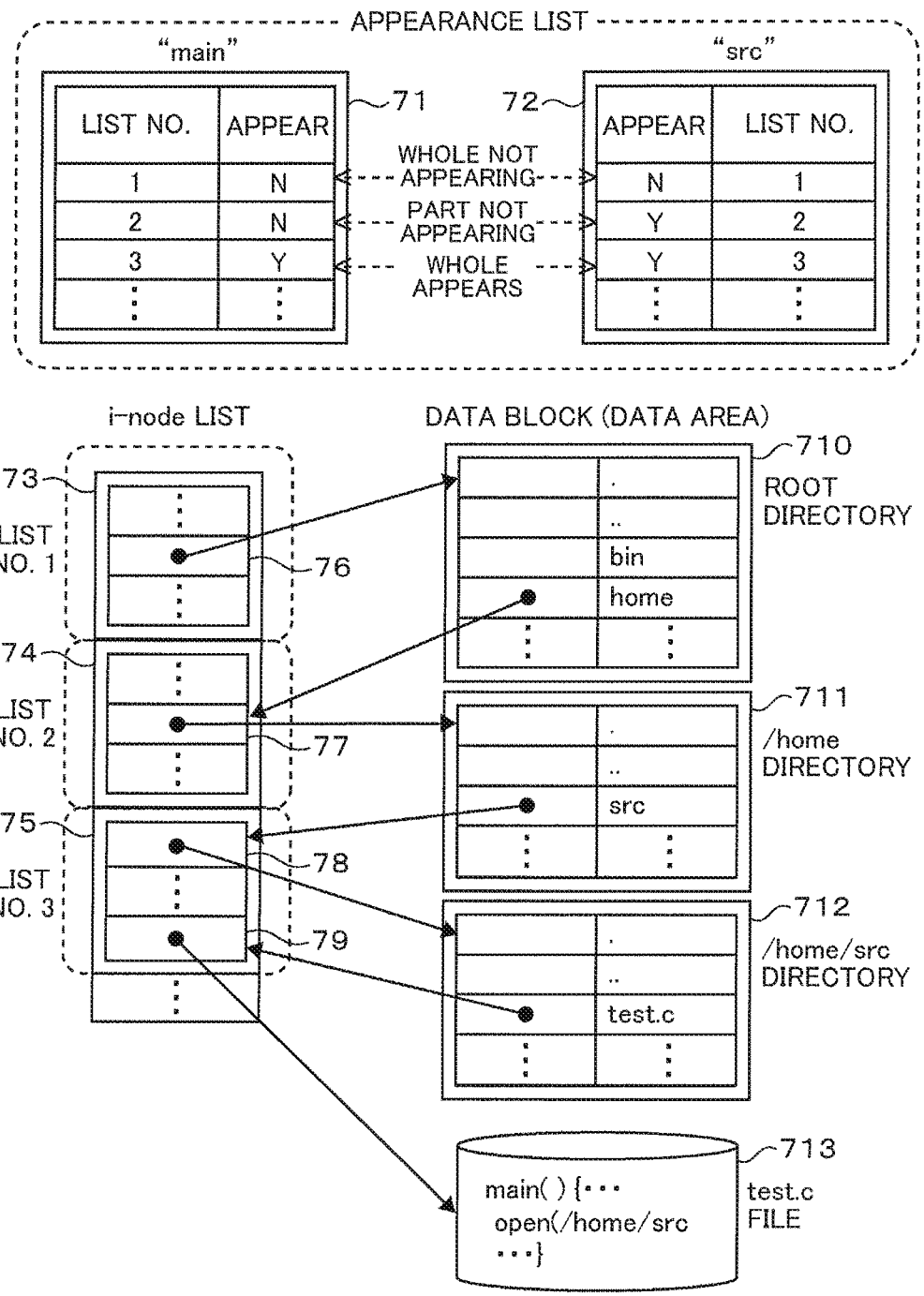
FIG. 7 is a diagram illustrating an example of a search using a file system.

FIG. 7 is a diagram illustrating an example of a file system. Some kind of OSs or file systems of computers manages directories and files using i-nodes. In such management, directories are also files and managed as data blocks in a data area. Plural i-nodes are enumerated and constitute an i-node list. As depicted in FIG. 7, an i-node 76 includes a pointer to a root directory 710 and individual directories and files in the root directory 710 include a pointer to an i-node. A directory label "home" in the root directory 710 has a pointer to an i-node 77 and the i-node 77 has a pointer to a "/home" directory 711.

A directory label "src" in the /home directory 711 has a pointer to an i-node 78 and the i-node 78 has a pointer to a "/home/src" directory 712. A file label "test.c" in the "/home/src" directory has a pointer to an i-node 79 and the i-node 79 has a pointer to a "test.c" file 713. By thus following a path from the root directory 710 to the "test.c" file 713, access can be made to the "test.c" file 713.

An i-node list is grouped into respective i-node sub-lists that are managed with list numbers. It is preferable that the unit of one i-node sub-list group is equal to the unit of data to be read for one read operation, just as described with FIG. 3. Now, an appearance list is used to manage whether or not a search key appears with respect to each list number. Since plural appearance lists include corresponding list numbers, management is made for a same one of the i-node sub-lists into which the i-node list was grouped.

For example, a search key "main" does not exist in data blocks pointed to by pointers included in two i-node sub-lists, namely, an i-node sub-list 73 managed with list number 1 and an i-node sub-list 74 managed with list number 2; hence, there are "not appear" ("N" in FIG. 7) indications for list numbers 1 and 2 in an "appear/not appear" ("APPEAR" in FIG. 7) indication column of an appearance list 71. In contrast, "main" exists in the "test.c" file 713 pointed to by the pointer of an i-node 79 included in a i-node sub-list 75 managed with list number 3; hence, there is an "appear" indication for list number 3 in the "appear/not appear" ("N" in FIG. 7) indication column of the appearance list 71. An appearance list 72 for "src" is referred to in a similar manner.

When searching a data block, such as a directory or file, including both search keys "main" and "src", the computer first judges that there is a "not appear" indication for list number 1 in both the "appear/not appear" indication column of the appearance list 71 and the "appear/not appear" indication column of the appearance list 72. That is, the computer can judge that both "main" and "src" do not appear in a data block pointed to by a pointer included in an i-node sub-list 73 with list number 1, the computer excludes the i-node sub-list 73 from the objects to search and proceeds to list number 2. The computer judges that there is an "appear" indication for list number 2 in the "appear/not appear" indication column of the appearance list 72, whereas there is a "not appear" indication for list number 2 in the "appear/not appear" indication column of the appearance list 71. Hence, the computer excludes the i-node sub-list 74 from the objects to search and proceed to list number 3.

The computer judges that there is an "appear" indication for list number 3 in the "appear/not appear" indication column of both the appearance list 71 and the appearance list 72. At this point of time, it is unknown which i-node in the i-node sub-list 75 managed with list number 3 is the one whose pointer points to a data block in which "main" and "src" exist. Then, the computer scans a data block pointed to by the pointer of each i-node in the i-node sub-list 75 to check whether or not "main" and "src" are included therein. The computer acquires the "/home/src" directory 712 pointed to by the pointer of an i-node 78 and scans the directory to look for "main" and "src". Further, the computer acquires the "test.c" file 713 pointed to by the pointer of an i-node 79 and scans the directory to look for "main" and "src" and scans the file to look for "main" and "src". In this example, the computer finds "main" and "src" in the "test.c" file 713.

As described in the foregoing, in the file system using i-nodes, based on the appearance lists 71, 72, the computer excludes the i-node sub-lists 73, 74, the root directory 710, and the "/home" director 711 from the objects to scan; this can reduce search processing tasks, thus enabling it to speed up a file search FIG. 8 is a diagram depicting an example of a computer configuration. The computer has two CPUs, a CPU-A 81 and a CPU-B 82, and the two CPUs are capable of executing processing independently. A dedicated cache A 83 is connected to the CPU-A 81 and a dedicated cache B 84 is connected to the CPU-B 82. Further, the computer includes a cache C 85 which is shared by the CPU-A 81 and CPU-B 82 and includes a memory 86 and a storage device 87, such as HDD (Hard Disk Drive) and SSD (Solid State Drive). These storage elements differ in terms of access performance and storage capacity. Among them, the cache A 83 and cache B 84 have the highest access performance and the smallest storage capacity. The cache 85 has the second highest access performance and the second smallest storage capacity. The memory 86 has the third highest access performance and the third smallest storage capacity. The storage device 87 has the fourth highest access performance and the fourth smallest storage capacity.

Appearance lists, namely, the n-gram appearance lists 12, 13, 21 to 24, 31, 32, 41, 42, B-tree appearance lists 62, 63, and appearance lists 71, 72 are simple information indicating whether or not a search key exists in a predetermined range. Since memory size required to store them is small, these lists are stored in the cache A 83 and cache B 84 or cache C 85, thereby enabling it to speed up search processing. Notably, since all information pieces in the appearance lists become processing objects, whereas information pieces other than those in the appearance lists may not become processing objects, an effect of speeding up search processing is enhanced by storing the appearance lists in the caches.

In an instance where pages include texts of questionnaire answers, as illustrated in FIG. 3, the texts occupy a large memory space and, therefore, the pages are stored in the storage device 87. Pages to, be read are decreased in number, based on appearance lists. Consequently, this decreases the number of times that the storage device 87 is accessed and the effect of speeding up search processing is enhanced.

In an instance where appearance lists are stratified, as illustrated in FIG. 2, plural appearance lists within a stratum may be processed in parallel by different CPUs. For instance, the sub-group wise n-gram appearance lists 21, 22 depicted in FIG. 2 are stored in the cache A 83 and processed by the CPU-A 81. In contrast, sub-group wise n-gram appearance lists, left out of the diagram, which are pointed to by pointers mapped to a same ID range in both the n-gram appearance lists 12, 13 are stored in the cache B 84 and processed by the CPU-B 82. Thus, two sub-group wise n-gram appearance lists can be processed in parallel by the two CPUs, CPU-A 81 and CPU-B 82.

Moreover, since different ID ranges in an appearance list are independent, different ID ranges may be processed in parallel by the CPUs. For instance, an ID range of 1 to 100 in both the n-gram appearance lists 12, 13 is stored in the cache A 83 and processed by the CPU-A 81. In contrast, an ID range of 101-200 in both the n-gram appearance lists 12, 13 is stored in the cache B 84 and processed by the CPU-B 82. Moreover, different ID ranges also in sub-group wise n-gram appearance lists may be processed by different CPUs and different page numbers in the n-gram appearance lists 31, 32 may be processed by different CPUs.

And now, even if the computer does not include the cache A 83 and cache B 84, appearance lists may be stored in the cache C 85 or memory 86 and shared by the CPU-A 81 and CPU-B 82 so as to be processed in parallel by different CPUs.

In an instance where texts of questionnaire answers are scanned, as illustrated in FIGS. 3 and 4, texts of questionnaire answers on different pages may be scanned in parallel by different CPUs. For instance, the page 33 with page number 1, depicted in FIG. 3, may be scanned by the CPU-A 81, whereas the page 36 with page number 40 may be scanned by the CPU-A 82. Although an example in which the computer includes two CPUs and three caches is presented in FIG. 8, no limitation to this is intended and the computer may include three or more CPUs and four or more caches.

The computer includes an input/output IF (interface) 88 to which a display, keyboard, and mouse, which are left out of the diagram, are connected and a network IF 89 which connects to a network which is left out of the diagram. The computer may receive setting information for processing a search via the input/output IF 88, and output a result of search from the input/output IF 88 and display on the display. Moreover, the computer may receive setting information via the network IF 89 and output a result of search. Further, the computer may receive data as a source to search and a program to be executed for a search via the network IF 89.

FIG. 9 is a diagram illustrating an example of a processing flow for creating appearance lists. Appearance lists may be created when an n-gram node, B-tree nodes, or i-nodes are created before the start of a search. An n-gram node and n-gram indexes or B-tree nodes and B-tree indexes may be created in advance and a search started, and appearance lists may be created when a first-time search is performed. An example in which appearance lists are created together with nodes before the start of a search is described here.

At step 91, the computer determines the unit in which groups are to be created: A range of IDs in units of 100 is one group in FIG. 1, one page is one group in FIG. 3, and a range of IDs in units of 10 is one group in FIG. 6. For the unit in which these groups are created, a user input value may be used or if such unit is the unit of data to read, such as a page, it may be acquired from a parameter of an OS and a file system. Then, the computer sets a loop of steps from step 92 to step 911 to be repeated as many times as the number of groups and proceeds to step 93.

At step 93, the computer acquires data in one group. Here, one group is a group having a data size corresponding to the unit determined at step 91 and one group is changed to another group in order, each time the loop is executed. Data is IDs and related gender, age, and questionnaire answers (texts) contained in one page such as a page 33 in the case of a text search in FIGS. 3 and 4; data is a search object table 61 in the case of an ID search in FIG. 6; and data is a data block in the case of a file system search in FIG. 7.

At step 94, the computer acquires all IDs from the data acquired at step 93. All IDs are: all IDs, 52, 73, 89, 95, etc. included within a range of 1 to 100, for example, in FIG. 1; those within a range of 1 to 15, for example, in FIG. 3; and all IDs, 1 to 3, 5, 8, etc. included within a range of 1 to 10, for example, in FIG. 6. Next, the computer sets a loop of steps from step 95 to step 910 to be repeated as many times as the number of IDs acquired at step 94 and proceeds to step 96.

At step 96, the computer acquires all n-characters in a text associated with one ID or values associated with one ID.

Here, one ID is changed to another ID in order, each time the loop is executed. Now, in the case of FIG. 3, all n-characters in a text associated with an ID of 01 are all 2-characters, "OU", "UT", "TD", etc. from the text of a questionnaire answer. Moreover, in the case of FIG. 6, values associated with an ID of 1 are "12" under C1 , "aaa" under C2, and "78" under C3.

At step 97, the computer registers all n-characters or values acquired at step 96 into an n-gram node or B-tree node, thus creating an n-gram node or B-tree node. At step 98, the computer registers the ID and all character positions, as necessary, into an index. That is, given that the ID value is 52 in step 96; in the case of FIG. 1, the computer registers the ID value of 52 into the n-gram indexes 14, 15 and registers character positions of 37 and 122 and character positions of 39 and 125 under this ID value. Moreover, given that the ID value is 1 in step 96; in the case of FIG. 6, the computer registers the ID value of 1 into the B-tree index 64 and registers the ID value of 1 into a B-tree index associated with a C2 value of "aaa", which is left out of the diagram, and a B-tree index associated with a C3 value of "78".

If a new n-character or new value has been registered at step 97; at step 99, the computer creates an appearance list relevant to the new n-character or ne value registered and registers a pointer to an index or "appear/not appear" information into the created appearance list or a previously created appearance list. Here, to create an appearance list in the case of FIG. 1, with respect to a new n-character "FO" in a text with an ID value of 52, the computer creates an n-gram appearance list 12 with the number of rows as many as the number of groups including, not only an ID range of 1-100, ID ranges of 101 and subsequent. Then, the computer registers the n-gram appearance list 12 as the destination of a pointer mapped to the n-character "FO" and registers the n-gram index 14 as the destination of a pointer mapped to an ID range of 1 to 100 in the n-gram appearance list 12. The computer sets a given value for a pointer mapped to an ID range of 101 and subsequent, the given value indicating that "FO" does not exist in this ID range.

After that, with respect to an n-character "FO" which is not new, but appears in a text with an ID value of 203, the computer registers the n-gram index 16 as the destination of a pointer mapped to an ID range of 201 to 300 in the already existing n-gram appearance list 12. Since "FO" does not exist in an ID range of 101 to 200, the computer remains a given value set when the list was created for the ID range of 101 to 200 in the n-gram appearance list 12, the given value indicating that "FO" does not exist in this ID range.

As described in the foregoing, it is possible to create n-gram appearance lists or B-tree appearance lists along with creating an n-gram node or B-tree node and n-gram indexes or B-tree indexes. And now, in the case of text scan illustrated in FIGS. 3 and 4 and the file system illustrated in FIG. 7, the computer should not execute an unnecessary step, since indexes or the like are not used in such case.

Figure 10:
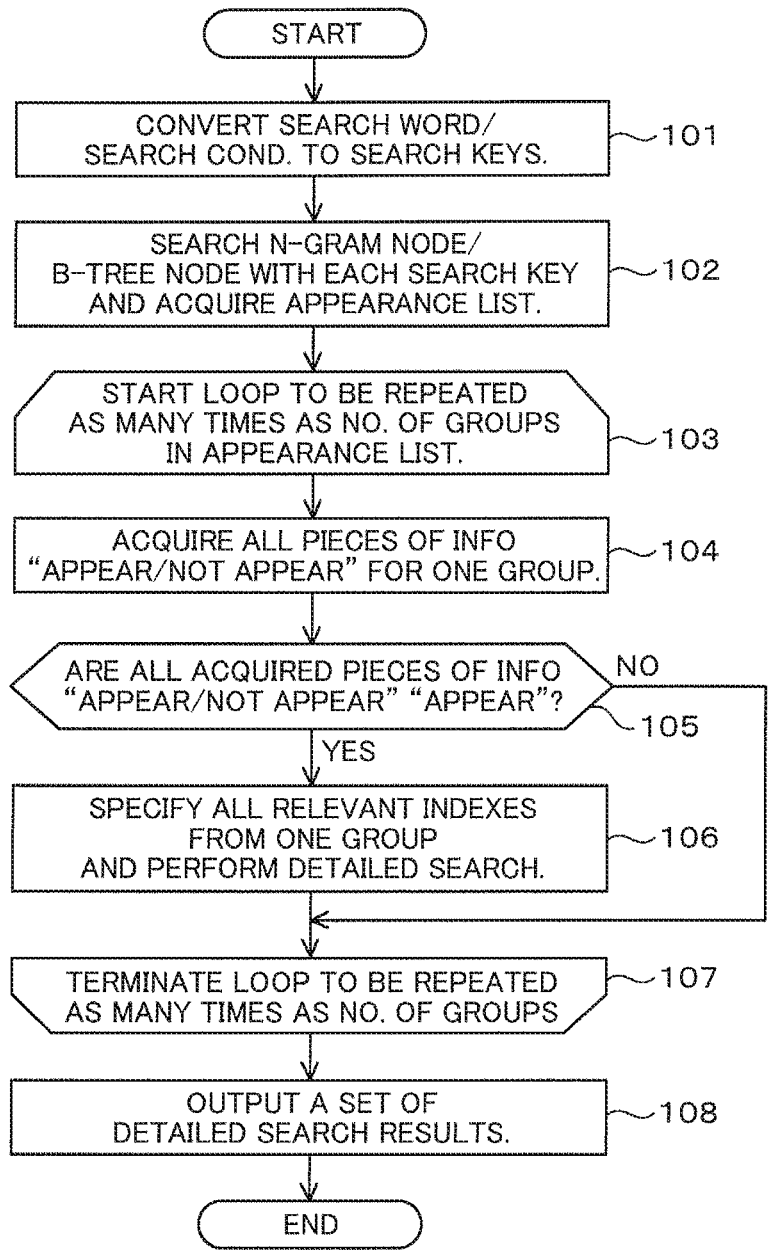

FIG. 10 is a diagram illustrating an example of a search processing flow using appearance lists. At step 101, the computer converts a search word 18 which is a search condition to search keys 19 or converts a search condition 68 to search keys 69. At step 102, the computer search an n-gram node or B-tree node with a search key, acquires a pointer mapped to an n-character or a value found with the search key, and acquires an appearance list by following the acquired pointer. Specifically, in the case of FIG. 1, the computer finds an n-character "FO" that matches "FO", one of the search keys 19, in the n-gram node 11 and acquires the n-gram appearance list 12 using the pointer mapped to the n-character "FO". Moreover, in the case of FIG. 6, the computer finds a value of 12 that matches a value of 12, one of the search keys 69, in the B-tree node for C1 and acquires the B-tree appearance list 62 using the pointer mapped to the value of 12.

The computer sets a loop of steps from step 103 to step 107 to be repeated as many times as the number of groups in the appearance list acquired at step 102 and proceeds to step 104. Here, the number of groups is, in the case of FIG. 1, the number of ID ranges in the ID range column of the n-gram appearance list 12, i.e., three ID ranges of 1 to 100, 101 to 200, and 201 to 300, and, in the case of FIG. 3, 40 page numbers in the page number column of the n-gram appearance list 31.

At step 104, the computer acquires all pieces of information "appear/not appear" or pointers indicating "appear/not appear" for one group from the appearance lists. Here, one group is changed to another group in order, each time the loop is executed. All pieces of information "appear/not appear" for one group is, for example, in the case of FIG. 3, a piece of information "appear/not appear" for page number 1 in the n-gram appearance list 31 and a piece of information "appear/not appear" for page number 1 in the n-gram appearance list 32. That is, they are all pieces of information "appear/not appear" in the plural n-gram appearance lists for one group that is page number 1. All pointers indicating "appear/not appear" for one group are, for example, in the case of FIG. 1, a pointer mapped to an ID range of 1 to 100 in the n-gram appearance list 12 and a pointer mapped to an ID range of 1 to 100 in the n-gram appearance list 13. That is, they are all pointers in the plural n-gram appearance lists for one group that is an ID range of 1 to 100.

At step 105, the computer judges whether or not all of the pieces of information "appear/not appear" acquired at step 104 are "appear" indications or whether or not all of the pointers indicating "appear/not appear" are "appear" indications. If the computer judges that all are "appear" indications, it proceeds to step 106 and executes a detailed search as regards one group associated with an "appear" indication as information "appear/not appear". For example, in the case of FIG. 3, page number 1 is one group associated with an "appear" indication and the computer acquires a page 33 with the page number 1 and scans the texts of questionnaire answers contained in the page 33 to look for "FOOT".

For example, in the case of FIG. 1, an ID range of 1 to 100 is one group associated with an "appear" indication. The computer acquires the n-gram index 14 from the destination of a pointer mapped to the ID range of 1 to 100 in the n-gram appearance list 12, acquires the n-gram index 15 from the destination of a pointer mapped to the ID range of 1 to 100 in the n-gram appearance list 13, and checks for ID matching and contiguous character positions, as already described with FIG. 1. After checking all groups by repeating the loop from step 103 to step 107, the computer outputs a set of detailed search results at step 108.

As described in the foregoing, based on the appearance lists, the computer executes a detailed search only if all pieces of information "appear/not appear" for one group are "appear" indications; this narrows down the objects for which a detail search should be executed, thus enabling to speed up a search. Alternatively, step 106 should be executed after the completion of checking for information "appear/not appear" for all groups in FIG. 10. If there are many groups for which all pieces of information "appear/not appear" are "appear" indications, that is, it takes time to complete detailed search processing, the computer may advise a user to revise the search condition.

Figure 11:
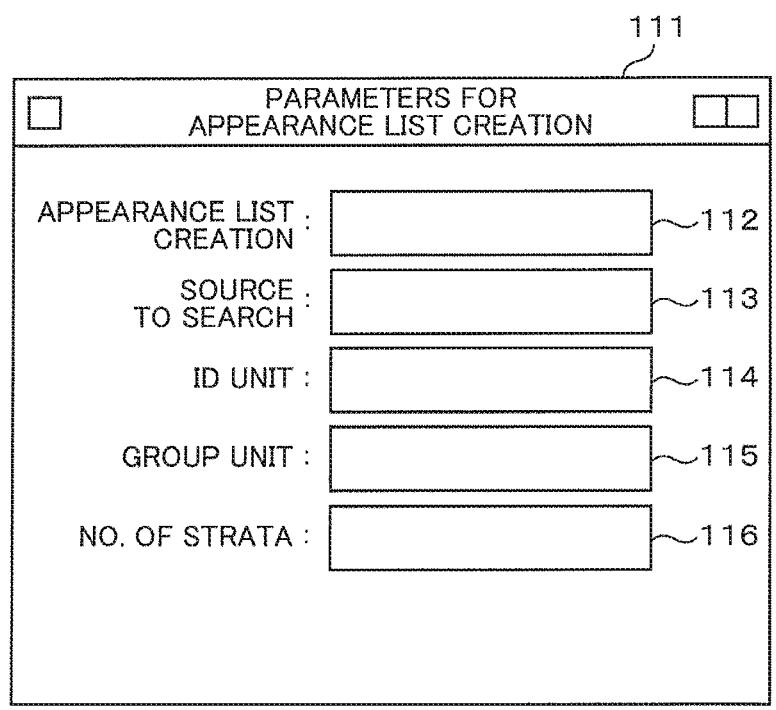
FIG. 11 is a diagram depicting an example of a screen for setting parameters for appearance list creation.

FIG. 11 is a diagram depicting an example of input of parameters for creating an appearance list. At step 91 depicted in FIG. 9, the computer may output data to be displayed in an window 111 via the input/output IF 88 to the display and accept entry for parameters made with the keyboard and mouse via the input/output IF 88. Alternatively, the computer may perform output and input to/from another computer in a network, connected to the computer via the network IF 89, and may transmit data to be displayed as output and receive parameters to be input via the network IF 89.

An input field 112 for appearance list creation is a field for inputting one of settings as follows: a setting not to create appearance lists, a setting to create appearance lists before the start of a search, and a setting to create appearance lists when a first-time search is performed. If the setting not to create appearance lists is input in this field, the computer does not execute step 99 depicted in FIG. 9 and registers relevant indexes into a node. If the setting to create appearance lists when a first-time search is performed, the computer does not execute step 99 depicted in FIG. 9, registers relevant indexes into a node, and creates and registers appearance lists when a first-time search is performed. If the setting to create appearance lists before the start of a search, the computer performs processing as described with FIG. 9.

An input field 113 for a source to search is a field for specifying a file or the like of data to search, i.e., a file or the like for which appearance lists are created. The name of a text file for which a text search is performed may be specified or the number of a database or the like containing data to search may be specified. At step 93, the computer acquires data from a file or the like specified in the input field 113 for a source to search.

An input field 114 for ID unit is a field in which IDs as mentioned in the descriptions with FIGS. 1 and 6 are specified. If IDs are explicitly included in a file or the like specified in the input field 113 for a source to search, because IDs exist, e.g., in the search object table 61 mentioned in the description with FIG. 6, these IDs are specified in the input field 114 for ID unit. If IDs are not explicitly included in a file or the like specified in the input field 113 for a source to search, sections and paragraphs as mentioned in the description with FIG. 1 may be specified in the input field 114 for ID unit. Alternatively, blocks of text lines may be specified as the ID unit. Since IDs are not used in the examples described with FIGS. 3 and 4, a setting in which no ID is specified in the input field 114 for ID unit may be possible.

An input field 115 for group unit is a field for specifying groups based on IDs specified in the input field 114 for ID unit or specifying grouping by acquiring parameters from an OS or file system. To prepare for the n-gram appearance lists 12, 13 described with FIG. 1, a unit of 100 is input in the input field 115 for group unit. To prepare for the B-tree appearance lists 62, 63 described with FIG. 6, a unit of 10 is input in the input field 115 for group unit 12. In the examples described with FIGS. 3 and 4, a unit of data to be read for one read operation is input from an OS or file system. A specified unit input in this input field 115 for group unit is common for all plural appearance lists. This enables it to make an "appear/not appear" judgment on those searched out with the search keys 19, 69 per group.

An input field 116 for the number of strata is a field in which the number of strata is specified. In the examples of FIGS. 1 and 6, appearance lists are of one stratum and, therefore, "1" is input in the input field 116 for the number of strata. Alternatively, the number of strata may be defaulted to 1 and the computer may judge that appearance lists are of one stratum, if nothing is input in this field. In the example of FIG. 2, appearance lists are of two strata of n-gram appearance lists 12, 13 and sub-group wise n-gram appearance lists 21 to 24 and, therefore, "2" is input in the input field 116 for the number of strata. Here, the sub-group wise n-gram appearance lists 21, 22 include sub-groups into which one group in the n-gram appearance list 12 is further grouped. Hence, to input the unit of the sub-groups, another entry should be added to the input field 115 for group unit, i.e., this field should have two entries. Then, in the input field 115 for group unit, "100" for the n-gram appearance list 12 and "10" for the sub-group wise n-gram appearance lists 21, 22 are input.

The input fields 112 to 116 each may allow input of strings, may allow selection with so-called radio buttons for selectable options which are arrayed and displayed, or may allow selection with a so-called pull-down menu.

As described in the foregoing, by dividing data to search into plural groups and managing a same group with plural appearance lists, the computer can judge what groups need not be searched; consequently, this reduces search processing tasks by skipping the groups that need not be searched, thus enabling it to speed up a search.

REFERENCE SINGS LIST

11: n-gram node,
12, 13: n-gram appearance list,
14 to 17: n-gram index,
18: Search word,
19, 69: Search keys,
21 to 24: Sub-group wise n-gram appearance list,
62, 63: B-tree appearance list,
64 to 67: B-tree index,
68: Search condition.

The invention claimed is:

1. A method for searching one or more documents with a computer for a specified string, the method comprising:
   a first step of dividing the specified string into a plurality of strings including a first string, as a first search key, and a second string, as a second search key;
   a second step of grouping the one or more documents into a plurality of blocks which are each units of data that can each be read in by the computer by one read operation;
   a third step of judging whether or not the first string appears in each of the plurality of blocks and including a first piece of appearance information indicating appearance of the first string with respect to each respective block in which the appearance occurs;
   a fourth step of judging whether or not the second string appears in each of the plurality of blocks and including a second piece of appearance information indicating appearance of the second string with respect to each respective block in which the appearance occurs; and
   a sixth step of, when the first piece of appearance information and the second piece of appearance information are included with respect to a first block in the plurality of blocks, reading in the first block and judging an existence of said specified string by comparing the document included in said first block with said specified string.

2. The method according to claim 1, further comprising:
   a seventh step of, when the first piece of appearance information or the second piece of appearance information is not included with respect to a second block in the plurality of blocks, not comparing the document included in said second block with said specified string.

3. The method according to claim 2, further comprising:
an eighth step of searching the document included in said first block read by a detailed search for the specified string.

4. The method according to claim 1, further comprising:
a fifth step of judging whether or not a third string which is one of the plurality of strings into which the specified string was divided, other than the first string and the second string, appears in each of the plurality of blocks and including a piece of appearance information with respect to each respective block in which the appearance occurs,
wherein, in the sixth step, when all pieces of appearance information including the first appearance information and the second appearance information are included with respect to a third block in the plurality of blocks, reading in the third block and judging an existence of said specified string by comparing the document included in said third block with said specified string.

5. The method according to claim 4, further comprising:
a seventh step of, when a piece of appearance information is not included with respect to a fourth block in the plurality of blocks in at least one of the third step, the forth step, and the fifth step, not comparing the document included in said fourth block with said specified string.

6. The method according to claim 5, further comprising:
an eight step of searching the documents included in said first block and the third block by a detailed search for the specified string.

7. The method according to claim 4,
wherein the comparison of the document included in said first block with the specified string and comparison with the document included in said third block with the specified string are performed in parallel in said sixth step.

8. The method according to claim 1,
wherein a message for revising a search condition is outputted when a number of the blocks that include all pieces of appearance information including the first piece of appearance information and the second piece of appearance information is more than a predetermined number of blocks.

9. The method according to claim 1,
wherein said appearance information is stored in a cache.

10. A method for searching one or more documents with a computer for a specified string, the method comprising:
a first step of grouping the one or more documents into a plurality of blocks which are units of data that can each be read in by the computer by one read operation;
a second step of judging whether or not a plurality of n-grams (where n is a natural number) each consisting of n characters appears in each of the plurality of blocks and including a piece of appearance information indicating appearance of the respective n-gram with respect to each respective block in which the appearance occurs;
a third step of dividing the specified string into a plurality of n-grams including a first n-gram, as a first search key, and a second n-gram, as a second search key; and
a fourth step in which, if both the piece of appearance information indicating appearance of the first n-gram and the piece of appearance information indicating appearance of the second n-gram are included with respect to a first block in the plurality of blocks, reading in the first block and judging an existence of said specified string by comparing the document included in said first block with said specified string.

11. The method according to claim 10, further comprising:
a fifth step of, when either the of appearance information indicating appearance of the first n n-gram or the piece of appearance information indicating appearance of the second n-gram is not included with respect to a second block in the plurality of blocks, not comparing the document included in said second block with the specified string.

12. The method according to claim 11, further comprising:
a sixth step of searching the document included in said first block by a detailed search for the specified string.

13. The method according to claim 10, wherein, in the fourth step, when pieces of appearance information indicating appearance of all the n-grams into which the specified string was divided including the piece of appearance information indicating appearance of the first n-gram and the piece of appearance information indicating appearance of the second n-gram are included with respect to a third block in the plurality of blocks, reading in the third block and judging an existence of said specified string by comparing the document included in said third block with said specified string.

14. The method according to claim 13, wherein, in the fifth step, when at least one of the pieces of appearance information indicating appearance of the n-grams into which the specified string was divided including the piece of appearance information indicating appearance of the first n-gram and the piece of appearance information indicating appearance of the second n-gram are not included with respect to a fourth block in the plurality of blocks, not comparing the document included in said fourth block with said specified string.

15. The method according to claim 14, wherein the sixth step includes searching the documents included in said first block and said third block by a detailed search for the specified string.

16. The method according to claim 13,
wherein the comparison of the document included in said first block with the specified string and comparison with the document included in said third block with the specified string are performed in parallel in said fourth step.

* * * * *